United States Patent

[15] 3,640,632

Schuman

[45] Feb. 8, 1972

[54] MACHINE TOOL SPINDLE AND CONTROL THEREFOR

[72] Inventor: Ralph H. Schuman, Cleveland, Ohio
[73] Assignee: The Warner & Swasey Company, Cleveland, Ohio
[22] Filed: Sept. 29, 1969
[21] Appl. No.: 861,590

[52] U.S. Cl. .............................................. 408/11, 408/129
[51] Int. Cl. .................................................. B23b 47/24
[58] Field of Search ....................... 77/32.1, 32.4, 32.7, 32.8, 77/34.7, 34.4; 408/11

[56] References Cited

UNITED STATES PATENTS 3,058,129  10/1962  Sullivan ............................. 77/34.4 X
3,487,730  1/1970   Dohring et al. ..................... 77/32.7 X

*Primary Examiner*—Francis S. Husar
*Attorney*—Yount and Tarolli

[57] ABSTRACT

A machine tool having a rotatable machine tool spindle for performing drilling and tapping operations. The spindle has limited axial movement relative to the spindle carrier. Fluid pressure means may be operated to displace the spindle in opposite directions from a predetermined position in the spindle carrier and to apply a force yieldably opposing return of the spindle to the predetermined position. The position of the spindle in its carrier is sensed by control means and the spindle carrier is translatable toward or away from the workpiece in response to the direction of displacement of the spindle from its predetermined position. The spindle is displaced forwardly to effect translation of the spindle carrier and spindle to engage a tool with a workpiece and the return of the spindle to the predetermined position upon the engagement of the tool with the workpiece is utilized to initiate control means for automatically controlling the depth of drilling or tapping as measured from the surface of the workpiece and the return of the spindle to an automatic repeat position or to a home position. The spindle is allowed to float while a tapping tool is in engagement with the workpiece and the feed and return of the spindle carrier is controlled during this period by sensing the position of the spindle in the carrier. During drilling the spindle is locked against axial movement relative to the carrier while the tool is in engagement with the workpiece. The locking means is engageable over the range of axial movement of the spindle relative to the carrier to locate the spindle in a predetermined position relative to the carrier.

17 Claims, 5 Drawing Figures

PATENTED FEB 8 1972

INVENTOR
RALPH H. SCHUMAN

BY Yount and Tarolli
ATTORNEYS

INVENTOR
RALPH H. SCHUMAN
BY Yount and Tarolli
ATTORNEYS 3,640,632

MACHINE TOOL SPINDLE AND CONTROL THEREFOR

The present invention relates to a machine tool having a rotatable spindle and means for producing relative axial movement between the rotatable spindle and the workpiece to effect the drilling or tapping of the workpiece. Subject matter in this application is related to that disclosed in copending application Ser. No. 861,589, filed by Harry Jacob on Sept. 29, 1969, and assigned to the same assignee as the present assignee.

An object of the present invention is to provide a new and improved machine tool in which a rotatable machine tool spindle to be used to selectively drill or tap is so constructed and arranged that the spindle may float relative to its support during a tapping operation with the machine including control means for sensing the position of the spindle relative to its support to effect the feed of the spindle in accordance therewith and so that the spindle may be selectively locked for drilling purposes or allowed to float for tapping purposes in response to the engagement of the tool in the spindle with the workpiece.

A still further object of the present invention is to provide a new and improved machine tool control system in which a rotatable machine tool spindle for performing an operation on a workpiece, e.g., tapping or drilling, and a workpiece are relatively moved to engage a tool in the spindle with the workpiece with the engagement of the tool in the spindle with the workpiece causing the operation of servo means for effecting additional movement of the spindle in accordance with stored information representing the increment that the spindle is to be moved after the tool engages the workpiece, the system preferably being such that upon movement of the prescribed increment, the system automatically reverses the relative movement between the workpiece and spindle to return the workpiece and spindle to relative positions for performing the next operation.

A still further object of the present invention is to provide a new and improved machine tool in which a rotatable spindle for performing an operation on a workpiece, e.g., drilling or tapping, may float axially relative to its carrier and a control means senses the position of the spindle relative to its carrier and effects relative movement between the spindle carrier and the workpiece in response to a displacement of the spindle from a predetermined position relative to the carrier, the system being so constructed and arranged that the position of the spindle relative to the carrier effects relative movement of the spindle and the workpiece to engage the tool and the spindle then to be selectively locked to the carrier or allowed to float while the tool is in engagement with the workpiece.

A further object of the present invention is to provide a new and improved machine tool having a rotatable machine tool spindle which has limited axial movement in opposite directions from a predetermined position in the spindle carrier and in which the spindle when positioned forwardly of the predetermined position effects translation of the spindle into engagement with the workpiece to cause the movement of the spindle to its predetermined position when the tool engages the surface of the workpiece, the movement of the spindle to its predetermined position actuating control circuitry for (1) controlling the depth of tapping as measured from the position of engagement of the tool with the workpiece surface, (2) reversing the direction of rotation of the spindle at the desired depth of tapping, and (3) returning the spindle to a retracted position clear of the workpiece, the movement of spindle carrier during the tapping and return operation while a tapping tool is engaged with the workpiece preferably being controlled in response to the position of the spindle relative to the spindle carrier.

A further object of the present invention is to provide a new and improved machine tool in which a digital control circuit for measuring an increment of movement of the spindle carrier is activated in response to the tool engaging the workpiece to selectively provide an error signal to servocontrol means for operating the spindle carrier to feed the spindle carrier until the tool reaches the desired depth in the workpiece and then to reverse the direction of the spindle carrier movement to retract the spindle or to provide a signal for reversing the operation of the other control means for effecting the movement of the spindle carrier during a tapping operation when the latter is at a predetermined position.

Still another object of the present invention is to provide a new and improved machine tool in which a rotatable tool spindle is yieldably biased forwardly to a position of a predetermined position in its spindle carrier to effect relative movement of the workpiece and spindle carrier towards each other axially of the spindle, the machine further including means responsive to the movement of the spindle to its predetermined position relative to its carrier in response to engagement with the workpiece to effect operation of the servo to move the spindle and tool the desired distance after the tool engages the workpiece.

A further object of the present invention is to provide a new and improved machine tool in which the engagement of a tool in the rotatable machine tool spindle with the workpiece establishes a reference for control means for moving the spindle a predetermined increment, the control means operating to reverse the movement after the carrier has moved the predetermined increment to move the spindle the same increment in the reverse direction and to activate additional circuitry to introduce a predetermined additional increment in the distance moved in the return direction so that control means and additional circuitry control the return position.

A still further object of the present invention is to provide a new and improved machine tool having a rotatable spindle which is to be used to tap an opening in a workpiece, the spindle being supported in the spindle carrier for limited axial movement and control means being adapted to sense the position of the spindle relative to the spindle carrier and to operate drive means for driving the spindle carrier in a direction to relatively position the spindle and spindle carrier in a predetermined position, with the system preferably being such that the control means may be selectedly utilized to return the spindle to a home position when the tapping tool disengages the workpiece or deactivated to allow additional control means to position the spindle in a different position relative to the workpiece.

Yet another object of the present invention is to provide a new and improved machine tool in which a spindle is biased to a position in its carrier forwardly of a locking position as the spindle is moved to engage a workpiece with the engagement of the spindle with the workpiece causing the spindle to move against the bias to the locking position with a locking means being activated to lock the spindle to the carrier when the spindle is in its locking position.

Further objects and advantages of the present invention will be apparent from the following detailed description of a specific form of the preferred embodiment made with respect to the accompanying drawings forming a part of the present specification for all subject matter disclosed therein and in which.

While the present invention is susceptible of various modifications and of uses in various types of machine tools, it is particularly useful in a machine tool having a horizontal spindle for drilling and tapping openings in a workpiece and is herein shown as embodied in such a machine.

Figure 1:
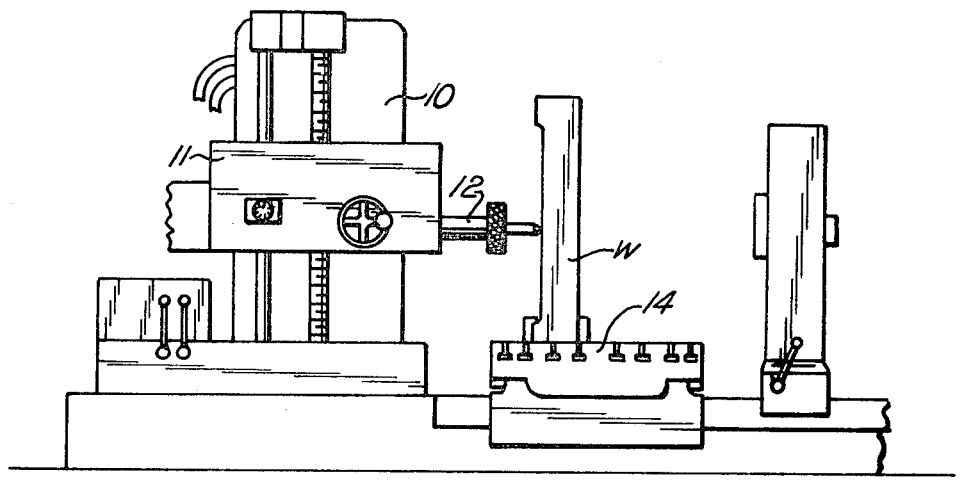
FIG. 1 is a front view of a machine tool embodying the present invention.

Referring to the drawings which show a specific form of the preferred embodiment of the present invention, the machine tool shown in FIG. 1 comprises a column 10 having a vertically movable spindle head 11 thereon in which a spindle 12 is rotatably supported. The machine also includes a table 14 mounted on the bed of the machine for movement in directions parallel to and tranversely of the axis of the spindle 12 to position a workpiece W supported thereon in proper position relative to the spindle 12. The spindle 12 has a conventional spindle nose for receiving an arbor for supporting a boring, drilling or tapping tool for boring, drilling or tapping a workpiece W. It will be understood that external threads are often cut by a female tapping die and that internal threads are formed by a male tapping tool. The term tapping is used herein as a generic term to both types of thread cutting except when the context otherwise limits the meaning to one or the other.

Figure 2:
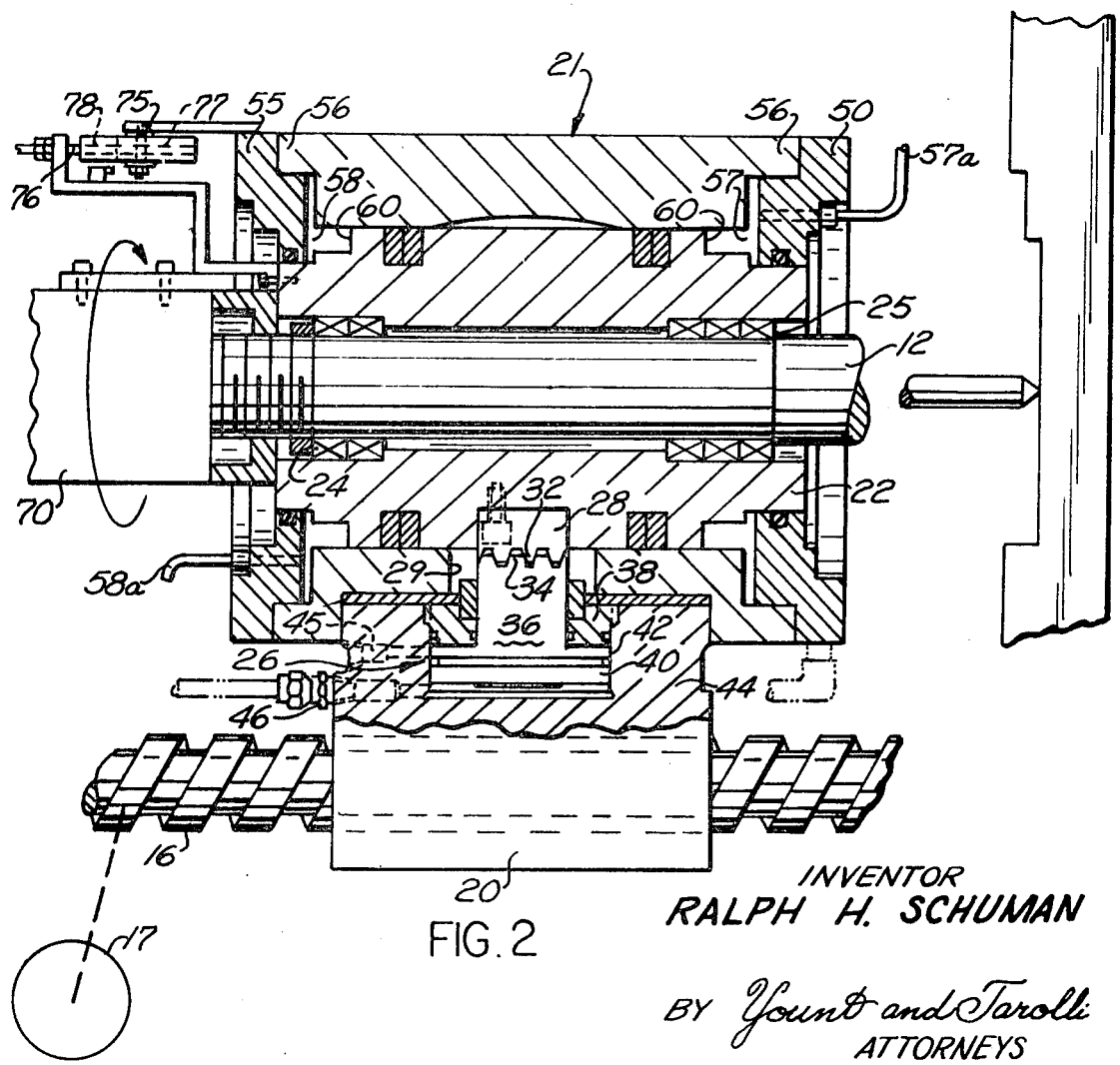
FIG. 2 is a sectional view through the spindle head of the machine tool of FIG. 1.

As is best shown in FIG. 2, the spindle 12 is supported in the spindle head 11 for rotation about the axis of the spindle and for translation in an axial direction to move the spindle 12 toward and away from the workpiece W.

The spindle 12 is moved axially in feed and return movements toward and away from the workpiece W by a lead screw 16 driven in a conventional manner by a motor 17. The lead screw 16 is rotatably supported in the spindle head parallel to the axis of the spindle and cooperates with a ball nut 20 fixed to a carrier member 21 which is supported in the spindle head 11 for movement parallel to the axis of the spindle. The spindle is rotatably supported in a spindle support member 22 which received in the carrier member 21 and supported therein for limited axial movement relative thereto. The spindle 12 is supported for rotation relative to the spindle support member 22 by spaced bearings 24, 25 adjacent the opposite ends of the spindle support member 22. The bearings 24, 25 also cooperate with external shoulders on the spindle and internal shoulders on the bearing support member to hold the spindle against relative axial movement with respect to the spindle support member.

The spindle support member 22 and, in turn, the spindle 12 can be locked against axial movement relative to the spindle carrier 21 by a locking means 26. The locking means 26 comprises a locking member 28 secured to the outer side of the spindle support member 22 and received in a slot 29 in the spindle carrier 21. The slot 29 allows for limited axial movement of the locking member 28 and the spindle support member relative to the spindle carrier 21.

The locking member 28 has a plurality of locking teeth or keys 32 spaced axially of the spindle and extending radially outwardly from the spindle support member. The locking teeth 32 are adapted to be engaged by complementary mating teeth 34 formed on a piston rod 36 which is slidable in a guide member 38 which is fixed to the spindle carrier 21. The piston rod 36 connects with a piston 40 which operates in a chamber 42 formed in a member 44 fixed to the spindle carrier 21 and forming a cylinder member for the piston 40. The member 44 has openings or conduits 45, 46 therein for supplying fluid pressure to the cylinder chamber 42 on opposite sides, respectively, of the piston 40. If fluid pressure is supplied to the conduit 45 and the conduit 46 connected to drain, the piston 40 is operated to move the mating teeth 34 out of engagement with the cooperating teeth 32. If the fluid pressure is supplied to the conduit 46 and the conduit 45 connected to drain, the piston 40 will be moved to engage the teeth 34 with the teeth 32. It will be noted that the teeth 34 are tapered in a direction converging toward the spindle support member so that as the teeth 34 are moved inwardly, they will locate the spindle in a precise position even though the spindle is not so located at the time the teeth start to engage. Preferably, when the teeth are fully engaged, there is root and tip clearance and the sides of the teeth form a wedge to accurately position the spindle. When the teeth 32, 34 are engaged, the spindle support member is locked against movement relative to the spindle carrier, and the spindle, the spindle support carrier and the spindle support member move as a unit insofar as movement axially of the spindle is concerned. With the teeth engaged, the only relative movement between these parts is the rotation of the spindle provided for by the bearings 24, 25. In the machine disclosed, the teeth 32, 34 are engageable over the full range of axial movement of the spindle so that the engagement of the teeth will cam the spindle to a predetermined position relative to the carrier if the spindle is displaced therefrom.

In the specific embodiment of the preferred form of the invention, the spindle can be shifted axially from the predetermined position by supplying fluid pressure to fluid pressure chambers formed at the opposite ends of the spindle support member 22. The outer ends of the spindle support member 22 are reduced in diameter and are received in axial bores in heads 50, 55 connected to the opposite ends of the spindle carrier 21. The heads 50, 55 are connected to axially extending flange portions 56 on the outer ends of the spindle carrier 21 to form cylinder chambers 57, 58 at the opposite ends of the spindle carrier 21 to receive fluid pressure for shifting the spindle support member 22 axially relative to the spindle carrier 21. The reduced portions of the spindle support member provide shoulders 60 which form movable piston walls of the chamber 57, 58 and which function as piston surfaces for shifting the spindle support member in response to fluid pressure in the chambers 57, 58.

Figure 3:
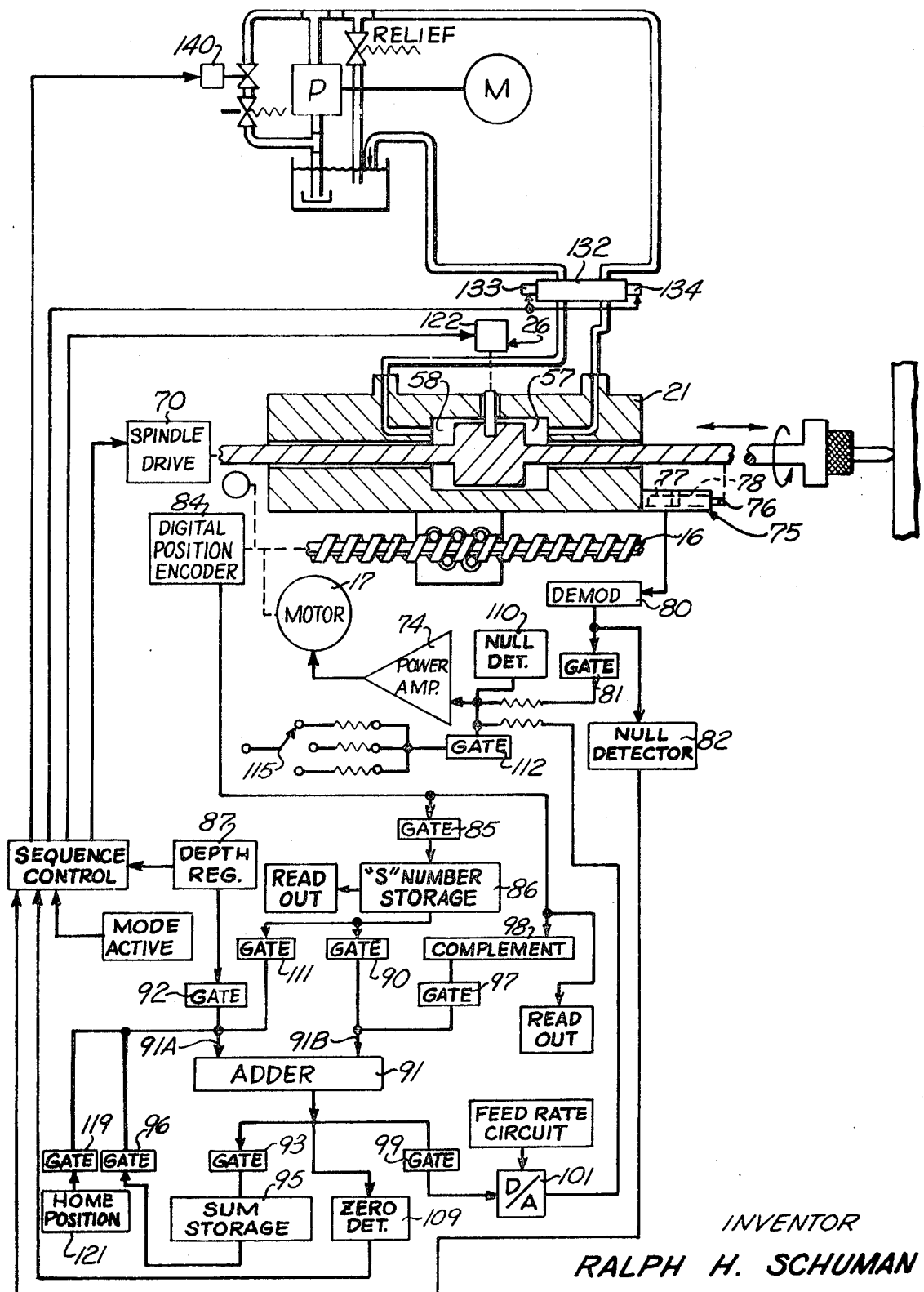
FIG. 3 is a block diagram showing parts of the drive for translating and rotating the spindle and the controls therefore.

The heads 50, 55 have fittings and conduits 57a, 58a for connecting the corresponding chambers to drain or to the discharge of a pump P, shown schematically in FIG. 3. If the chamber 58 is connected to the source of fluid pressure and the chamber 57 connected to drain, the spindle support member 22 and spindle will be shifted toward the workpiece relative to the spindle carrier 21 provided the locking mechanism is unlocked and the spindle is free to move in that direction. After shifting, the spindle will be held in a forward position by the fluid pressure in the chamber 58. If the spindle carrier is then driven forwardly, the fluid pressure will cause the support member 22 and, in turn, spindle 21 to move forwardly with the spindle carrier.

Similarly, the pressure chamber 57 may be supplied with pressure fluid and the chamber 58 connected to drain to shift the spindle rearwardly in the spindle carrier.

The spindle is rotated during drilling, boring or tapping by a spindle drive 70. The drive 70 is supported by a bracket fixed to the rearward end of the spindle support member 22 and is connected to the rearward end of the spindle to rotate the latter. The drive 70 and its connection to the spindle to effect a rotation of the latter is conventional and therefore the structure thereof will not be shown or described herein in detail. In the preferred embodiment, the drive 70 includes a reversible variable-speed motor adapted to supply in cooperation with its gearing, which may include a shiftable transmission, the desired rotational speed and torque for the selected machining operation.

The motor 17 for driving the lead screw 16 to relatively move the spindle carrier and workpiece operates in response to an error signal applied to the input of the power amplifier 74 best shown in FIG. 3. The power amplifier 74 effects operation of the motor in a direction dependent upon the polarity of the signal to the power amplifier and at a rate dependent upon the magnitude of the signal. Such power amplifiers are well known to those skilled in the art.

In the illustrated machine, an error signal may be supplied to the power amplifier 74 when the spindle support member 22 is displaced either forwardly or rearwardly from its predetermined position in the spindle carrier 21 where all the locking teeth are in engagement to effect movement of the carrier in accordance with the signal. This error signal is derived by sensing means for sensing the position of the spindle and comprising a differential transformer 75 having a core 76 fixed to the spindle support member 22 and coils 77, 78 mounted on the spindle carrier 21. The output from the differential transformer is zero if the core is in a center position with respect to the coils and the core is adjusted to be in such a position when the spindle is in its predetermined locked position relative to the spindle carrier. If the spindle is displaced forwardly of the predetermined locked position, the core is moved to provide an output signal of one phase from the differential transformer and if shifted in the opposite direction it provides a signal of the opposite phase. The output signal from the differential transformer is demodulated by a demodulator 80 to provide a signal of one polarity at the output of the demodulator if the core is shifted in one direction and an output signal of the opposite polarity if the core is shifted in the opposite direction with the magnitude of the output signal in each case depending upon the magnitude of the signal from the differential transformer which, in turn, depends upon the displacement of the core from the center position. The demodulated output signal from the demodulator 80 is applied to the input of the power amplifier 74 through an AND-gate 81. Accordingly, when the spindle is shifted forwardly from its locked position, a signal will be applied to the power amplifier to operate the motor 17 in a direction to translate the spindle carrier 21, and, in turn, the spindle toward the workpiece. If fluid pressure is supplied to the chamber 58 and chamber 57 connected to drain to shift the spindle to its maximum forward position, the spindle will move at a rapid traverse rate. The pressure fluid in the fluid pressure chamber 58 will cause the spindle to move forwardly with a spindle carrier until the tool engages the workpiece. Preferably, the pressure urging the spindle forwardly relative to the carrier is reduced after the carrier and spindle start moving.

When the tool engages the workpiece, the continued driving of the spindle carrier by the motor 17 will cause the spindle to move rearwardly against the fluid pressure in the chamber 58. The fluid pressure supply includes a suitable pressure relief valve which allows the fluid pressure to be relieved when it exceeds the normal high pressure to be supplied by the system. As the spindle moves rearwardly relative to the spindle carrier, the signal from the differential transformer 75 will be reduced in magnitude and when the spindle is in its predetermined position where all the locking teeth of the locking means 26 are engageable, there will be no output from the differential transformer to cause operation of the motor 17. In the specific form of the preferred embodiment illustrated in the drawings, a null detector 82 detects the null which occurs at the output of the demodulator 80 at this time and initiates a further control of the spindle. If the tool in the spindle is for drilling a hole, the output of the null detector will cause fluid pressure to be supplied to the locking mechanism to lock the spindle support member to the spindle carrier. If the tool is a tapping took, the spindle will not be locked as explained hereinafter in more detail. In any case, the null detector 82 causes the drive 70 to start rotating the spindle. For a tapping operation, the spindle support member is not locked to the spindle carrier and as the spindle starts to rotate, the tapping tool threading into the workpiece will feed the spindle forwardly to shift the spindle and its support member relative to the spindle carrier. Preferably, a high pressure is applied to the spindle at the start of the tapping operation. The shifting of the spindle relative to the spindle carrier will cause an output from the differential transformer 75 to the power amplifier 74 which will cause the motor 17 to drive the spindle carrier to follow the spindle to maintain the spindle and spindle carrier in a null position.

When the null detector 82 signals that the tool is in engagement with the workpiece and the spindle is in its predetermined position relative to the spindle carrier, a control circuit is operated to cause the tool to move inwardly of the workpiece a predetermined distance from the workpiece surface. The distance of movement inwardly from the surface of the workpiece is presettable either by the operator or in response to a program, e.g., a control tape. The control means may be of various types for controlling movement of the spindle to a commanded position from its immediate position.

In the specific form of the preferred embodiment which is illustrated in the drawings, a digital position encoder 84 is driven by the lead screw 16 and encodes the position of the spindle carrier 21 along the lead screw 16 with respect to a machine reference. When the tool in the spindle engages a surface of the workpiece and causes the spindle support member and the spindle to move to its predetermined position with respect to the spindle carrier where the differential transformer has a null, the reading of the encoder 84 is a position number which may be used as a reference number indicating the position of the workpiece surface. If the spindle carrier and spindle support members are maintained in their predetermined null position and the motor 17 operated to drive the spindle forwardly to change the reading of the encoder by a given increment, the tool will have moved into the workpiece a corresponding increment.

In accordance with the specific form shown, the spindle carrier is directed to move an additional distance which is the same as the depth of the hole to be tapped or drilled. When a null signal is detected by the detector 82 with the tool in engagement with the workpiece, the reading of the digital position encoder 84 is gated by a gate 85 to a reference storage register 86. This establishes the reference position of the surface of the workpiece and may be considered, for purposes of the depth of the hole, as the position number of a reference plane designating the workpiece surface. In the illustrated form of the invention, the number corresponding to the depth to be drilled or tapped is stored in a depth register 87. After the number or reading of the position encoder 84 has been gated into the reference storage register 86 in response to the null detection, a gate 90 is operated to gate the reference number in the storage register 86 to one input 91B of an adder 91. Simultaneously with the actuation of the gate 90, a gate 92 is operated to gate the number registered in the depth storage register 87 to an input 91A of the adder 91 so that the output of the adder 91 is the sum of the position number at the time that the differential transformer went to a null and the depth to be drilled by the tool in the spindle. The sum output of the adder 91 is gated by a sum gate 93 to a sum storage circuit 95. The sum gate 93 is operated simultaneously with the gates 90 and 92. The gates 90, 92 and 93 may be AND gates operated from the same signal which effects operation of the AND-gate 85 but with a suitable time delay. Also, a gate 96 is operated with a suitable time delay after the operation of gates 90, 92 and 93 to gate the number registered in the sum storage 95 into the input 91A of the adder 91. Simultaneously with the gating operation of the gate 96 to gate the sum storage number into the adder 91, a gate 97 is operated to gate the complement of the reading of the digital encoder 84 to the input 91B of the adder 91. The gate 97 is connected to the output of a complementing circuit 98 having its input connected to the output of the digital position encoder 84. By adding the complement of the digital position encoder reading to the number added in the sum storage, a subtraction is effectively performed by the adder 91 with the difference number representing the difference between the desired final position of the spindle for drilling the desired depth and the immediate position. Initially, this will correspond to the depth of offset registered in the depth circuit 87. For drilling or boring, a gate 99 is activated simultaneously with the operation of the gate 97 to supply the output of the adder circuit 91 to a digital-to-analog converting circuit 101 whose output is connected to the input of the power amplifier 74. This causes the power amplifier 74 to operate the motor 17 to drive the lead screw 16 to feed the spindle to move the tool into the workpiece. Movement of the tool into the workpiece will cause the difference number at the output of the adder 91 to be progressively reduced as the reading of the digital encoder 84 approaches the number stored in the sum storage circuit 95. The gates 97, 99 are of the AND gate type and are maintained activated while the servo is controlled in response to the output of the adder 91 as the tool moves inwardly.

If the tool in the spindle is a drilling tool, the spindle support member in the spindle will be locked to the spindle carrier to move axially as a unit therewith by the initial null detection from the differential transformer 75. If the tool is a tapping tool, the locking mechanism will not be engaged and the differential transformer output continues to be gated, after being demodulated, to the power amplifier so that the signal is effective to cause the spindle carrier to follow the spindle toward the workpiece as it is fed in by the tapping tool. In this condition the spindle may be said to float relative to the spindle carrier and the differential transformer will now operate in view of the resistance offered by the workpiece to the tapping operation to keep the spindle in its predetermined position with respect to the spindle carrier 21. Consequently, the reading of the digital encoder 84 will accurately reflect the position of the tool. When tapping, the gate 99 to the digital-to-analog circuit 101 is not activated and the output of the adder is only used to determined when the proper depth of tapping has occurred.

When the tool in the spindle has been moved to the proper depth in the workpiece, the output of adder 91 will be zero. A zero detector 109 operates to detect this zero. This null detection causes a signal to be applied to the amplifier 74 to withdraw the tool and operates to reverse spindle rotation if the control is in the tapping mode.

The detection at the full depth of drilling or tapping causes the gate 96 to be operated to block the number in the sum storage circuit 95 from the input 91A of the adder 91 and causes a gate 111 to be opened to gate the reference number stored in the reference storage register 86 to the input 91A of the adder 91. The adder now functions to add the reference number in the reference storage register and the complement position number indicated by the digital position encoder 84. It will be recalled that the reference number in the storage register 86 corresponds to the position number of the reference plane in which the surface of the workpiece is located. When the complement of the position of the spindle carrier 21 is added to the reference number, the output of the digital-to-analog converter 101 will be a signal of different polarity from that which caused forward movement of the spindle and will cause the motor 17 to operate in a reverse direction to withdraw the spindle from the workpiece. If the machine is operating in a tapping mode, the zero detector 109 which causes the number in the reference storage 86 to be added to the input 91A of the adder 91 also causes the pressure applied to the fluid pressure chamber 58 to be released and pressure to be supplied to the fluid pressure chamber 57 to urge the spindle rearwardly with respect to the spindle carrier and the direction of rotation of the motor 70 to be reversed. In the tapping mode, this will cause the motor 17 to drive the spindle carrier to follow the spindle as the tapping tool backs out of the tapped hole since the differential transformer will operate in the same manner as it did when tapping the hole to supply a control signal to the power amplifier 74.

The spindle may be retracted to a home position or to a repeat position spaced a small distance from the surface of the workpiece. In the latter case, a gate 112 is operated when the spindle retraction is initiated to supply an offset signal to the input of the power amplifier 74. The signal supplied through the gate 112 is a signal which is additive to that being supplied from the digital-to-analog converter 101 when the withdrawal of the spindle starts. Accordingly, before the input to the power amplifier can be zero, the spindle will have to be withdrawn to a position where the complement of the position number has different relative magnitude with respect to the number in the adder 91 than it has on the start of withdrawal so that the polarity of the digital-to-analog converter will reverse and oppose the signal being applied through gate 112. This reversal will occur when the reading of the encoder indicates that the spindle carrier 21 is positioned in the position that corresponds to the reference plane of the workpiece and the motor will continue to operate until the signal from the digital-to-analog converter nulls the signal being supplied through the gate 112. This null is detected by a null detector 110 an this detection operates to stop the spindle in a position where the tool is offset a predetermined amount, as determined by the offset signal, from the surface of the workpiece. The null detection at this time provides a signal for the table to be indexed and positioned relative to the spindle for the next hole.

When the machine is operating under a tape control, this null detection by the null detector 110 will effect a transfer from a buffer storage into active storages the commands for the next operation. In the case where the depth of drilling or tapping is to be repeated, the buffer storages will only transfer additional new information to position the workpiece in a proper Y and X position with respect to the spindle and when this is accomplished, the spindle will again be operated through a repeat cycle.

The offsetting signal which is supplied through the gate 112 to determine the offset on the return of the spindle may be manually set by the operator by means of a selector switch 115. Selector switch 115 can be set in engagement with anyone of a plurality of contacts each connected to the input for the gate 112 through a resistor with the resistors having different magnitudes to provide different input signals and a selection of offsets. If the operation of the spindle is a tapping operation where the spindle is free to float relative to the spindle carrier, the pressure forcing the spindle rearwardly with respect to the spindle carrier on retraction will cause the spindle to move to its maximum rearward position with respect to the spindle carrier when the workpiece and tool clear each other. This would cause a signal from the differential transformer which would cause the offset circuitry and the adder circuit 91 to lose control of the retraction of the spindle. Accordingly, in the tapping mode, the gate 81 is closed in response to a zero detection in the adder circuit 91 by the zero-detecting circuit 109, when the tool is retracted to the surface of the workpiece. When drilling, the gate 81 is closed during retraction as described above.

Instead of being retracted only a short distance from the surface of the workpiece, the circuit may be set to retract the spindle to a predetermined home position. In this condition, a home gate 119, rather than the gate 111 and the gate 112, is actuated in response to the zero detection of the zero detector 109 on movement of the tool to the proper depth to supply to the input 91A of the adder 91 the position number which corresponds to the home position. This number is stored in a home position register 121 which may be set manually or by tape.

The fluid pressure system includes a two position solenoid valve 122 which is energized to unlock the spindle and deenergized to supply fluid pressure to operate the locking means to a clamping position.

High pressure may be established in the chambers 57, 58 by energizing a solenoid valve 140 which when energized blocks a conduit normally connecting the discharge of the pump to drain. The conduit includes a low-pressure relief valve on the downstream side of the solenoid valve 140 that limits the system pressure to a relative low magnitude unless the solenoid valve 140 is closed.

The valves for supplying pressure fluid to the chambers 57, 58 and to the locking means 26 as well as the valves for effecting high pressure are shown schematically in FIGS. 3 and 4. The valves include a three-position solenoid valve 132 having solenoids 133 and 134 which are respectively energized to connect a particular one of the chambers 57, 58 to pressure and the other chamber to drain. When the valve is in its center position, pressure fluid to the spindle is blocked and the chambers 57, 58 are connected to drain.

Figure 4A:
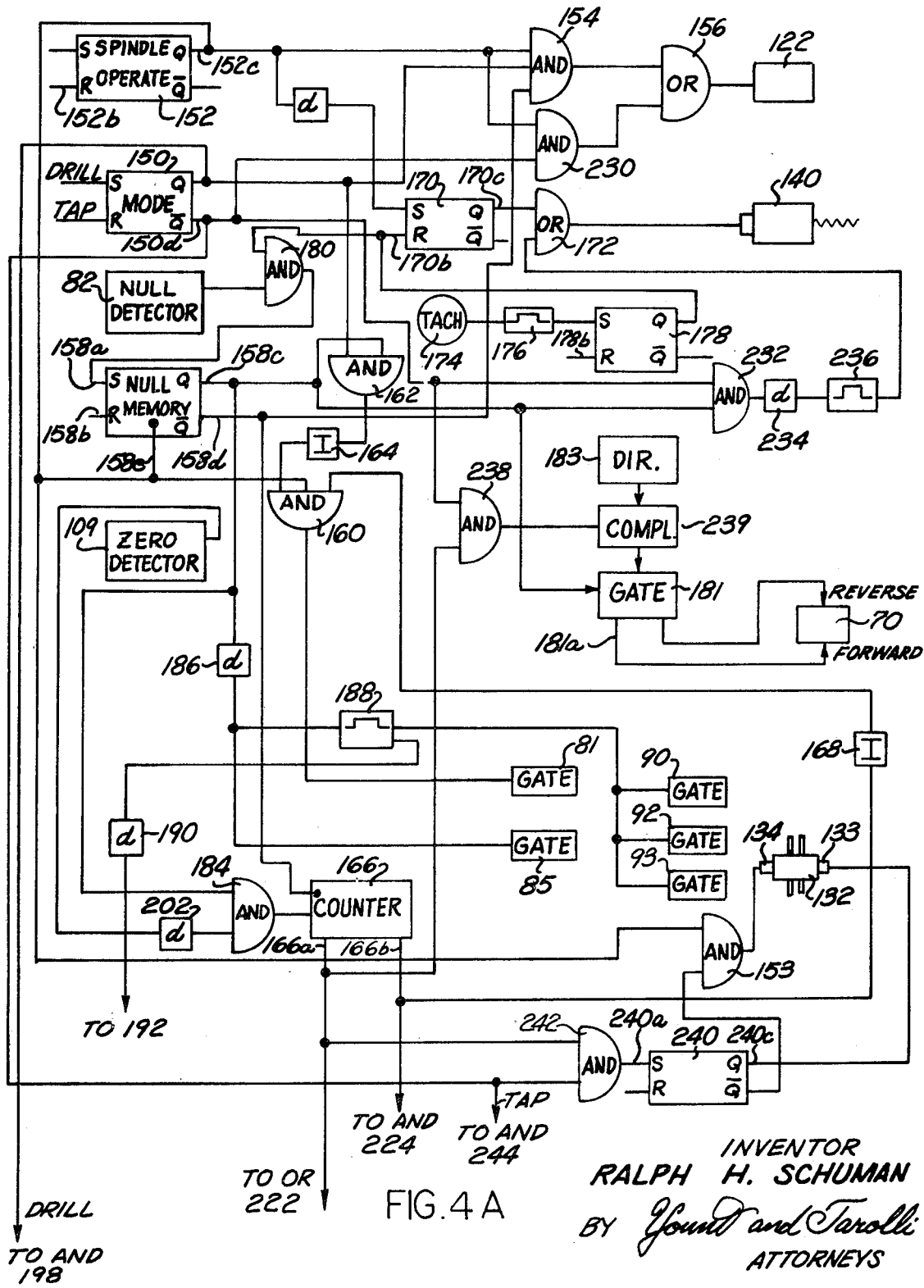
FIGS. 4A and 4B are electrical diagrams, primarily in block form, illustrating a sequencing and control circuit used with the electrical controls shown in FIG. 3.
Figure 4B:
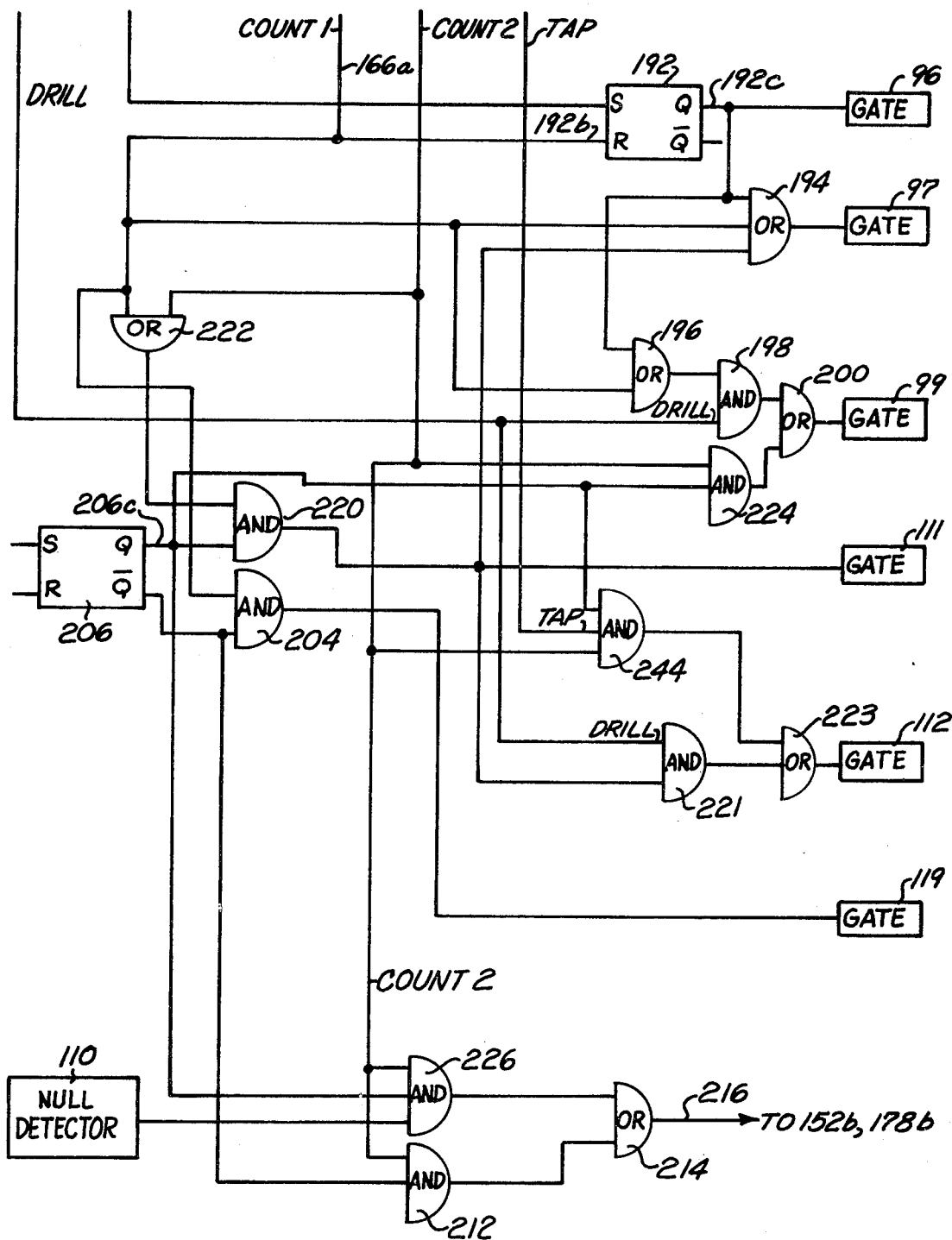

FIGS. 4A and 4B illustrate a typical sequencing circuit which may be utilized within the illustrated machine. The circuit includes a mode bistable memory circuit 150 which when set causes the machine to operate in the drilling mode and and which when reset causes the machine to operate in a tapping mode. The circuit also includes a spindle operate bistable memory circuit 152 which effects operation of the spindle to drill or tap a hole when activated to its set condition from its reset condition.

When the mode memory circuit 150 is set so that the machine is to operate in the drilling mode, the setting of the spindle operate memory circuit 152 establishes a Q output on its set output terminal 152c to immediately effect the energization of the solenoid 134 of the solenoid valve 132 to supply fluid pressure to the chamber 58 to supply pressure for displacing the spindle axially. The solenoid 134 is energized through an AND-gate 153 which is activated by the Q output of a bistable memory circuit 240 which is in its reset condition at the start of an operation.

The Q output of the memory circuit 152 also effects the energization of solenoid valve 122 to unclamp the spindle if the latter is clamped so that the fluid pressure in the pressure chamber 58 can shift the spindle forwardly. Referring to FIG. 4A, it will be noted that the output 152c of memory circuit 152 is connected to one input of an AND-gate 154 having its output connected to one input of an OR-gate 156 whose output energizes the spindle unclamp valve 122. It will be recalled that in the drilling mode the spindle is to be clamped when the null detector 82 detects a null. Accordingly, the AND-gate 154 has a second input conditioned by the $\overline{Q}$ output of a null memory circuit which is lost when the null detector detects a null after engagement of the tool and workpiece. The loss of this $\overline{Q}$ output causes deactivation of AND-gate 154 and the deenergization of the solenoid valve 122 to clamp the spindle support member and spindle carrier. The third input of the AND-gate 154 is conditioned by the Q output of the mode memory circuit 150 which is in a set condition during a drilling operation.

The setting of the spindle operate memory circuit also activates the gate 81 so that the differential transformer 75 will effect the feeding of the spindle carrier 21 in response to the forward shifting of the spindle. The Q output 152c of memory circuit 152 is connected to one input of an AND-gate 160 whose output is connected through an OR-gate 161 to activate gate 81. The AND-gate 160 has a second input which is connected to the output of an AND-gate 162 through an inverter 164. The AND-gate 162 is not activated at the start of a drilling operation. While the gate has one input connected to the set output of the mode memory circuit 150, its second input is connected to the set output 158c of the null memory circuit 158 which is in its reset condition at the start of an operation. Consequently, at the start of a drilling operation the AND-gate 162 will have a logic 0 on its output which is inverted by the inverter 164 to condition one input of the AND-gate 160. The third input of the AND-gate 160 is normally conditioned from a zero detection counter 166 through an inverter 168. This input is provided to close the gate 81 during a tapping operation when the tool is returned to the workpiece surface as will be described hereinafter.

With the AND-gate 81 activated, the signal from the differential transformer 75 caused by the forward displacement of the spindle will effect operation of the motor 17 to feed the spindle carrier toward the workpiece.

The setting of the spindle operate memory circuit 152 also sets a high-pressure memory circuit 170 to establish a Q output on its set output 170c which is applied through an OR-gate 172 to energize the high-pressure solenoid valve 140 to supply high pressure to the chamber 58. The high-pressure memory circuit is reset after the motor 17 and lead screw 16 start to rotate. The lead screw drives a tachometer 174 whose output triggers a threshold circuit 176 to set a bistable lead screw start memory circuit 178 when the lead screw 16 starts to rotate. The memory circuit 178 has a Q output which is supplied to the reset terminal 170b of the high-pressure memory circuit 170 to reset the latter and deenergize the high-pressure valve 140.

The feeding of the spindle carrier in response to the signal from the transformer 75 continues until the tool engages the workpiece and null detector 82 detects that the resistance of the workpiece has caused the movement of the spindle to its null position in the spindle carrier resulting in a null at the output of demodulator 80 which is detected by the null detector 82. On the detection of the null, an output signal from the detector activates an AND-gate 180 to apply a set signal to the set input 158a of the null memory circuit 158 to set the latter. This causes the loss of the $\overline{Q}$ output on the reset output 158d of the memory circuit 158 and the establishment of a Q output on its set output 158c. The loss of the $\overline{Q}$ output causes the deactivation of the AND-gate 154 to deenergize the solenoid valve 122 to lock the spindle support member and the spindle carrier.

The AND-gate 180 whose output sets the memory circuit 158 in response to the null detector 82 has an input conditioned by the Q output of the lead screw start memory circuit 178. This assures that null detector 82 will not prematurely set the null memory circuit 158.

In addition to clamping the spindle support member and spindle carrier, the setting of the null memory circuit 158 deactivates the gate 81, in the drilling mode under discussion, by establishing a second input to the AND-gate 162 to cause the loss of an input to AND-gate 160 whose loss of output deactivates the AND-gate 81. The setting of the null detection memory circuit also operates an AND-gate 181 to control the spindle drive 70 to effect rotation of the spindle in accordance with the setting in a direction register 183.

The register 183 may be a two-condition register which has a 1 output for one condition and a 0 output for the other condition. When the gate 181 is activated, a 1 signal will appear on either an output 181a or an output 181b depending on the condition of register 183 and of a complementing circuit 239. A 1 signal on output 181a effects operation of the spindle motor in a forward direction and a 1 signal on output 181b effects rotation in a reverse direction.

The setting of the null memory circuit 158 also conditions an AND-gate 184 to pass zero detection signals from the zero detector 109 to the zero detector counter 166 and activates the gate 85 to store the reading of the encoder 84 in the reference number storage register and initiates, with suitable delays, the activation of gates 90, 92, 93 and then gates 96, 97, 99. The activation of gates 90, 92, 93 effects the adding of the desired depth of drilling stored in the depth register 87 to the reading of the encoder and stores the sum in sum storage 95. The subsequent activation of gates 96, 97 causes the adder to add the sum in the sum register and the complement of the position encoder 84 to provide a digital error signal at the adder output as explained hereinabove, and the activation of gate 99 applies the error signal to the digital-to-analog converter 101. To activate the gate 85, the establishment of the Q output on the set output 158c of the null memory circuit 158 is differentiated by a circuit 186 and the differentiated signal applied to the gate 85 to activate it momentarily. The differentiated signal is also applied to a monostable multivibrator 188 to trigger it to its unstable state. When switched to its unstable state, the multivibrator supplies a signal to momentarily activate the gates 90, 92, 93 and when it returns to its stable state an output signal is differentiated by a circuit 190 to provide a signal for setting gage control memory circuit 192 to establish a Q output on its set output 192c. The set output 192c of the memory circuit 192 is connected to gate 96 to activate it, to one input of an OR-gate 194 whose output activates the gate 97, and to one input of an OR-gate 196. The output of OR-gate 196 is connected to one input of an AND-circuit 198 whose output is connected to one input of an OR-gate 200 having an output connected to activate gate 99. The AND-gate 198 has its second input connected to the set output of the mode memory circuit 150 so that the gate 99 is activated from the gate control memory circuit 192 through the AND-gate 198 only when drilling.

When the gates 96, 97 and 99 are activated, the spindle carrier is fed toward the workpiece to move the tool into the workpiece until the zero detector 109 detects a zero at the output of adder 91 signifying that the tool has moved the proper depth into the workpiece as measured from the workpiece surface. This detection effects an output from the zero detector 109 which is differentiated by a circuit 202 to provide a pulse signal to the AND-gate 184 and, in turn, to the counter 166 to establish a count of 1 therein and to provide a signal on a "count-of-1" output 166a.

When a signal is established on the "count-of-1" output 166a of the zero detection counter 166, the spindle, when operating in a drilling mode, is to return either to an automatic repeat position or to a home position. To return the spindle to a home position, the home gate 119 as well as the gate 97 between the complementing circuit for the encoder 84 and the input 91B of the adder 91 must be activated and the gate 96 must be closed. The gate 96 is closed by applying the signal on the "count-of-1" output 166a of the counter 166 to the reset terminal 192b of the gate control memory circuit 192 to reset the circuit so that is loses its Q output on its set output 192c. This does not deactivate the gates 97 and 99 since the OR-gates 194, 196 each have an input connected to the "count-of-1" output 166a of the counter 166.

If the spindle is to return to a home position, the home gate 119 is activated by the output of an AND-circuit 204. The AND-circuit 204 has one input connected to the output 166a of the counter 166 and a second input connected to the $\overline{Q}$ output of an automatic repeat memory circuit 206. The $\overline{Q}$ output has a signal thereon when the memory circuit 206 is in its reset condition as it is when the spindle is to return to a home position.

The output of the digital-to-analog converter 101 will now supply an input error signal to the power amplifier 74 until the error output of the adder circuit 91 is zero and this will occur when the encoder reads the same as the position number stored in the home position register 121. When this position is reached, the zero detector 109 will have a second output which establishes an additional count in the counter 166 so that the output is lost on the "count-of-1" output 166a and an output established on a "count-of-2" output 166b. The signal on the "count-of-2" output 166b is utilized to activate an AND-gate 212 which has a second input conditioned by the $\overline{Q}$ output from the memory circuit 206. When these two inputs to the AND-gate 212 are present, the AND gate is activated to supply a signal to an input of an OR-gate 214 whose output 216 is utilized to reset the spindle operate memory circuit 152 and the lead screw start memory circuit 178. The resetting of the spindle operate memory circuit 152 causes the loss of a steering input to the null memory circuit 158. The Q output of the spindle operate memory circuit is connected to a steering input 158e of the memory circuit 158. The memory circuit 158 will be reset and maintained in the reset condition so long as there is no input to the steering input 158e. When there is a logic 1 applied to the steering input 158e, the circuit will be in its reset condition but can be set and reset by applying signals to the set input 158a and to the reset input 158b which is not utilized in the present circuitry.

If the spindle is to be returned to an automatic repeat position where the tool in the spindle is a short distance from the surface of the workpiece preparatory to a repeat operation after the indexing of the table, the automatic repeat circuit 206 will be in a set condition.

When the automatic repeat memory circuit 206 is in a set condition, it provides a Q output on its set output 206c and no output on its reset output 206d. The loss of the Q output on the reset output makes the AND-gate 204 nonresponsive to the establishment of an output signal on the "count-of-1" output 166a from the zero detector counter 166 so that the home gate 119 is not activated by this detection.

The gates 97,99 for applying the complement of the position encoder to the input 91b of the adder 91 and the error output of the adder 91 to the input of the digital-to-analog converting circuit 101 are activated in the same manner for automatic repeat operation as for the home operation. In addition, the Q output of the automatic repeat memory circuit 206 conditions an AND-gate 220 to respond to an output signal on the "count-of-1" output 166a which is applied to the AND-gate 220 through an OR-gate 222. The output of the AND-gate 220 is connected to activate gate 111 for applying the reference number in the reference number storage register 86 to the input 91A of the adder 91. The output of AND-gate 220 is also connected to one input of an AND-gate 221 having a second input connected to the set output 150c of the mode memory circuit 150. The output of AND-gate 221 is connected to activate the offsetting gate 112 through an OR-gate 223 when the AND-gate 220 is activated in response to the count of 1 in the counter 166 and the Q output of the automatic repeat memory circuit.

After the activation of gate 111 in response to the first zero detection, there will be an error signal at the output of adder 91 which causes the motor 17 to retract the spindle. When the tool in the spindle reaches the workpiece surface, the output of the adder 91 will be zero and the zero detector 109 will add a second count to the counter 166. In the drilling mode for automatic repeat, this zero detection is to be ignored and the gates 97, 99, 111, 112 are to remain activated until the output from the digital-to-analog converter nulls the offset signal being supplied from the offset selector switch 115. Accordingly, the "count-of-2" output of the counter 166 is connected through the OR-gate 222 to maintain the AND-gate 220 activated. This maintains the gates 111, 112 in an activated condition. The "count-of-2" output 166b of the counter 166 is also connected to an input of an AND-gate 224 which has a second input connected to the Q output of the automatic repeat memory circuit 206 and an output connected to an input of the OR-gate 200 whose output activates the gate 99 between the adder 91 and the digital-to-analog converter 101. This maintains the gate 99 activated after the second zero detection so that the output of the adder 91 can be used to null the offset signal from the selector 115. When such a null occurs at the input of the power amplifier 74, it is detected by the null detector 110. The null detector 110 at this time activates an AND-gate 226 which has an output connected to one input of the OR-gate 226 which has an output connected to one input of the OR-gate 214 to provide a reset signal on its output connection 216. The AND-gate 226 has one input conditioned by the Q output of the automatic repeat memory circuit 206 and a third input conditioned by the output 166b of the counter 166. The output from the OR-gate 214 resets the circuitry as in the case of home operation.

In a tapping operation, the operation of the circuit is similar to the foregoing except that pressure is increased in the chamber 58 at the start of the tapping operation and the gate 99 is maintained closed during the tapping operation so that the output of the adder is not supplying an input signal to the digital-to-analog converter 101. Instead, the gate 81 is activated to supply a signal from the differential transformer 75 to the power amplifier 74 to cause the motor 17 to operate to drive the lead screw 16 to, in turn, cause the spindle carrier to follow the spindle as the tapped threads cause the tapping tool to move the spindle inwardly of the workpiece and then outwardly of the workpiece when the spindle rotation is reversed. In the tapping mode, the circuit 150 will be in its reset condition to establish a $\overline{Q}$ output on its reset output 150d. With no Q output from the mode memory circuit 150, the AND-gate 154 will not be activated to unclamp the spindle at the start of the operation, but an AND-gate 230 which is conditioned by the $\overline{Q}$ output of the memory circuit 150 will be activated to unclamp the spindle in response to the establishment of the Q output of the spindle operate memory circuit 152. The AND-gate 230 has an output connected to an input of the OR-gate 156 for energizing solenoid valve 122 to unclamp the spindle. Since the spindle is to be unclamped during the time that the tool is tapping the workpiece, the AND-gate 230 will remain energized until the memory circuit 152 is reset.

At the time that the tool engages the workpiece and a null is to be detected, a high pressure is to be momentarily applied to the tapping tool while the tapping operation starts. At this time, the high-pressure solenoid valve 140 is energized by activation of an AND-gate 232 having one input connected to the $\overline{Q}$ output of the mode memory circuit 150 and a second input connected to the Q output of the null memory circuit 158 so that when the null detector 82 detects a null and sets the memory circuit 158 on engagement of the tool with the workpiece, the AND-gate 232 is activated to supply an output which is differentiated by a circuit 234 to provide a differentiated signal to the input of a monostable multivibrator circuit 236 whose output is connected to an input of the OR-gate 172 which has an output connected to energize high-pressure solenoid valve 140. The monostable multivibrator will return to its stable state with a time delay so that the high-pressure solenoid valve 140 is only energized for a short time at the start of the tapping operation.

Since the AND-gate 162 is not activated by the setting of the null memory circuit 158 when operating in the tapping mode because one of its inputs is conditioned from the Q output of the mode memory circuit 150, the AND-gate 160 is not deactivated upon the setting of the null memory circuit 158 as in the case of a drilling operation and the AND-gate 81 between the demodulator 80 and the power amplifier 74 is maintained activated to supply the signal from the differential transformer 75 to the power amplifier 74. The AND-gate 99 for connecting the adder to the digital-to-analog converter 101 is not activated in this mode of operation since the AND-gate 198 is not activated in the tapping mode because it has one input connected to the Q output of the mode memory circuit 150.

The activation of the gates 90, 92, 93 and 96 and 97 will be as described for the case of drilling when the memory circuit 158 is set. As the tapping occurs, the output of the adder 91 will be changed toward zero and when the full depth of tapping has occurred, the output of the adder 91 will be zero and this will again be detected by the zero detector 109. The zero detector 109 will establish a count of 1 in the counter as in the case of drilling. The establishment of the count of 1 in the adder 166 maintains the gate 97 and the gates 111 and 112 or the gate 119 activated in the same manner as for the drilling operation depending upon whether the spindle is to be returned to a home position or a repeat position; but, additionally, causes a reversal of the direction of spindle rotation. To this end, the "count-of-1" output 166a is connected to one input of an AND-gate 238, FIG. 4A, having its output connected to a circuit 239 for complementing the direction information stored in the direction register 183. When an output appears on the AND-gate 238, the direction signal is complemented to cause a reversal of spindle rotation and the tapping tool then causes the spindle to start withdrawing from the workpiece to move to either the home position if the gate 119 is actuated or to the repeat position if the gates 111 and 112 are actuated. The AND-gate 238 has a second input which is conditioned by the $\overline{Q}$ output of the mode memory circuit 150 so that the reversal of spindle rotation only occurs in the tapping mode.

In addition to reversing the direction of spindle rotation, the establishment of an output on "count-of-1" output 166a also effects an energization of the solenoid 133 of the solenoid valve 132 to reverse the pressure acting on the spindle. The "count-of-1" signal on the output 166a is applied to the set input 240a of the memory circuit 240 through an AND-gate 242 to provide a signal on its Q output 240c to effect energization of the solenoid 133. The output 166a is applied to one input of the AND-gate 242, the other input of the AND gate being connected to the $\overline{Q}$ output of the mode memory circuit 150 so that the AND-gate 242 is only activated in a tapping mode.

When the memory circuit 206 is set for a repeat operation and when the spindle has been retracted to the reference position set in reference number storage 86, the zero detector will add a count of 2 in the counter if the spindle is set for an automatic repeat operation. In the tapping mode, this second zero detection opens the gate 99 so that the output of the adder 91 can be used to null the offsetting signal being applied by the offset selector switch 115 as well as opening the gate 112 to introduce the offsetting signal. It also effects the closing of the gate 81. The "count-of-2" output 166b is connected to one input of an AND-gate 244 having its second input conditioned by the $\overline{Q}$ output of the mode memory circuit 150 and a third input conditioned by the Q output of the automatic repeat circuit. The output of the AND-gate 244 is connected to one input of the OR-gate 223 for activating the gate 112. The gate 81 is deactivated at this time by the loss of an input to one input of the AND-gate 160. The input to the AND-gate 160 which is lost is derived from the output of the inverter circuit 168 which has its input connected to the count-of-2 output 166b so that the establishment of a signal on this output causes the loss of the output of the inverter and, in turn, the loss of output from the AND-gate 160.

When the offsetting signal from the selector switch 115 is nulled, a null detector 110 will operate AND-gate 226 to effect a resetting of the circuitry for the next operation.

When the spindle is to be returned to a home position with the machine operating in a tapping mode, the number applied to the input 91A of the adder 91 is the position number of the home position and the second zero detection will not occur until the spindle reaches home. Consequently, when the tool clears the workpiece, the mode of operation of the circuit is not changed and the pressure in the pressure chamber 57 will displace the piston support member 22 relative to the piston carrier to provide a maximum signal from the differential transformer 75 to rapidly retract the spindle to its home position. When it reaches the home position, the zero detector 109 will establish the count of 2 in the counter 166 and this will activate the AND-gate 212 to reset the spindle operate circuit 152. The other memory circuits not yet reset are either reset by the output from the OR-gate 214 when the AND-gate 212 is activated or by the resetting of the spindle operate memory circuit 152.

It will be noted that the engagement of the locking teeth 32, 34 after the return to the home position will cam the spindle to the locked predetermined position when the differential transformer 75 is in a balanced condition.

In the illustrated embodiment the counter 166 is disenabled and reset to zero by the $\overline{Q}$ output of null memory circuit 158. This assures that the counter remains in a zero state until after the first null detection.

In summary it can be seen that the control circuit for the spindle is such that a control means comprising the differential transformer 75 and the demodulator 80 is responsive to the displacement of the spindle to supply an error signal to effect relative movement between the spindle carrier 21 and the workpiece. Moreover, the encoder 84, and adder 91 for comparing position numbers applied thereto and its associated gates may be operated to provide an error signal to effect drilling for a predetermined increment from the surface of the workpiece or used as a measuring means during tapping operation to measure the increment of relative movement between the workpiece and spindle from the workpiece surface after engagement of the tool and to effect a reversal of the relative movement when the workpiece has been tapped to the predetermined depth. The reversal of relative movement in tapping is effected by reversing the direction of rotation of the spindle in response to the first zero detection at the output of adder 91 to cause the spindle to back itself out of the tapped hole.

I claim:

1. In a machine tool having a spindle carrier, a spindle supported for rotation in and for limited axial movement with respect to said spindle carrier, said spindle being movable between a locking position relative to said carrier and a forward position displaced forwardly of said locking position toward the workpiece and being yieldably biased when in said forward position against movement toward said locking position, means for effecting relative movement between the spindle and the workpiece axially of the spindle to relatively move the spindle and workpiece to engage a tool in the spindle with a workpiece and to retract the spindle from the workpiece, control means for sensing when said spindle has moved axially against said bias to said locking position in response to engagement with the workpiece, and locking means selectively responsive to said control means for locking the spindle against relative movement in an axial direction with respect to the carrier.

2. In a machine tool as defined in claim 1 wherein said control means provides an output signal indicating the magnitude of said displacement of said spindle from said locking position and said machine tool further comprises means for selectively rendering said locking means nonresponsive to said control means and for rendering said output signal effective to control the relative movement between said spindle and workpiece while a threading tool in the spindle is engaged with the workpiece.

3. In a machine tool as defined in claim 1 wherein said spindle is rotatably supported in a spindle support member axially movable in said carrier, said locking means comprising cooperating locking elements on said support member and carrier, and said carrier has power-actuated means thereon for moving said elements into and out of engagement with each other.

4. In a machine tool, a spindle carrier, a spindle supported in said spindle carrier for rotation and for limited axial movement relative to the spindle carrier, locking means for locking said spindle against movement axially relative to said spindle carrier, and means for selectively actuating said locking means to lock said spindle against axial movement relative to said spindle carrier in response to a condition indicative of the engagement of a tool in the spindle with a workpiece.

5. In a machine tool as defined in claim 4 wherein a spindle support member is supported in said carrier for limited axial movement relative thereto and said spindle is rotatably mounted in said spindle support member and constrained against axial movement relative thereto.

6. In a machine tool a rotatable machine spindle, a spindle carrier supporting said spindle for rotation and for limited axial movement from a predetermined position relative to the carrier, and drive means for driving said carrier to effect relative movement axially of the spindle between the spindle and a workpiece, first control means settable to stop relative movement between said workpiece and spindle after a predetermined increment of relative movement after the tool in the spindle engages the work surface and comprising storage means for storing a setting indicative of the depth of the tool that the spindle is to penetrate the workpiece from the surface thereof, control circuitry responsive to a condition indicative of the engagement of the tool in the spindle with the surface of the workpiece and to said control means, said control circuitry including additional control means activated in response to the tool moving through said increment of movement after engagement with the surface of the workpiece to reverse the direction of relative movement between said spindle and workpiece to move the spindle and workpiece to a return position to withdraw the tool from the workpiece and second control means for sensing the magnitude of displacement of said spindle from said predetermined position and providing an error signal indicating the magnitude of displacement and means responsive to said error signal for controlling said drive means to effect relative movement between said spindle carrier and workpiece after engagement of the tool and workpiece in accordance with said error signal.

7. In a machine tool having a spindle carrier, a machine tool spindle supported in said carrier for rotation and for limited axial movement between a predetermined position relative to the carrier and a traverse position disposed forwardly of said predetermined position toward a workpiece, said spindle having a bias thereon when in said traverse position yieldably opposing movement to said predetermined position, control means responsive to said spindle being disposed forwardly of said predetermined position to effect relative movement between said spindle carrier and workpiece in a direction to engage a tool in the spindle with the workpiece, said bias yielding when the tool engages the workpiece to allow the movement of said spindle to said predetermined position relative said carrier in response to the resistance of the workpiece to continued relative movement between said spindle carrier and workpiece, circuit means responsive to the return of said spindle to said predetermined position for providing a control signal for effecting a control operation, and means for selectively locking said spindle against axial movement relative to said carrier and selectively responsive to said circuit means when said spindle is returned to said predetermined position in response to the engagement of the tool with the workpiece to selectively lock the spindle against axial movement relative to the spindle carrier.

8. In a machine tool as defined in claim 7 wherein said circuit means provides an error signal indicating the magnitude of the displacement of said spindle from said predetermined position and said machine includes means for selectively rendering said locking means nonresponsive to said circuit means and for effecting relative movement between said carrier and workpiece in response to said error signal for threading operations.

9. In a machine tool having a spindle carrier, a machine tool spindle supported in the carrier for rotation and for limited axial movement between a predetermined position relative to the carrier and a traverse position disposed forwardly of said predetermined position toward a workpiece, said spindle having a bias thereon when in said traverse position yieldably opposing movement to said predetermined position, control means responsive to said spindle being disposed forwardly of said predetermined position to effect relative movement between said spindle carrier and workpiece in a direction to engage a tool in the spindle with the workpiece, said bias yielding when the tool engages the workpiece, said bias yielding when the tool engages the workpiece to allow the movement of said spindle to said predetermined position in response to the resistance of the workpiece to continued relative movement between said spindle carrier and workpiece, said control means comprises means providing an error signal indicating the magnitude of the displacement of said spindle forwardly of said predetermined position and drive means responsive to the magnitude of said error signal to effect relative movement of said spindle and workpiece toward each other.

10. In a machine tool as defined in claim 9 wherein the resistance of said workpiece and the continued driving of said drive means effects a return of the spindle to said predetermined position upon engagement of the tool with the workpiece to null said error signal.

11. In a machine tool as defined in claim 6 wherein said control circuitry comprises means for effecting rotation of said spindle in response to said spindle being moved to said predetermined position upon engagement of the tool with the workpiece to tap an opening in said workpiece to effect continued relative movement of said spindle carrier and workpiece toward each other in accordance with said error signal during the tapping operation and said first control means comprises means for measuring the relative movement of said carrier and workpiece subsequent to said engagement.

12. In a machine tool as defined in claim 11 in which said additional control means includes means for reversing the direction of the spindle rotation in response to the relative movement of said carrier and workpiece through said additional increment to back the tapping tool from the tapped opening and to effect relative movement of said carrier and workpiece in a return direction in response to said error signal.

13. In a machine tool control system for controlling a rotatable machine tool spindle and drive means for effecting the relative movement axially of the spindle between the spindle and a workpiece comprising digital control means settable to stop relative movement between said workpiece and spindle after a predetermined increment of relative movement, storage means for storing information indicative of the depth a tool in the spindle is to penetrate the workpiece from the surface thereof, first control means responsive to a condition indicative of the engagement of a tool in the spindle with the surface of the workpiece to actuate said digital control means in accordance with said storage means to effect said increment of movement, and second control means responsive to said digital control means when said increment of movement is effected to reverse the direction of relative movement between said spindle and workpiece to move the spindle and workpiece to a return position in which the tool in said spindle is clear of the workpiece.

14. A machine tool control system as defined in claim 13 wherein said system comprises circuit means and said second control means establishes a position number in said circuit means as a destination number which number corresponds to the relative position of said spindle and workpiece at the time of engagement of the tool and workpiece and said second control means includes means for effecting an additional increment of movement upon the return of said spindle and workpiece to the position represented by said destination position number to move the tool in the spindle to said return position clear of the workpiece.

15. In a machine tool control system as defined in claim 13 wherein said machine includes a spindle carrier and said spindle is rotatably supported in said carrier for limited axial movement in either direction relative to said carrier from a predetermined axial position in said carrier and said first control means includes sensing means for sensing the magnitude of displacement of said spindle from said predetermined position and providing an error signal indicating the magnitude of the displacement and said drive means comprises means responsive to said error signal for effecting relative movement between said spindle carrier and workpiece after engagement of the tool and workpiece.

16. In a machine tool, a spindle carrier, a rotatable spindle supported in said carrier for limited axial movement relative thereto, said spindle having a traverse position to which it is biased when moving to engage a tool therein with a workpiece and a second position to which it is movable in response to the engagement with the workpiece, first control means providing a signal indicating displacement of said spindle from said second position to effect movement of said spindle in dependence on the position of said spindle relative to said carrier, digital control means for effecting relative movement of said spindle and workpiece to predetermined relative positions in accordance with digital data set therein, and means for selectively rendering said first control means effective to engage the tool in the spindle with the workpiece and said digital control means effective on engagement of the tool and workpiece and for selectively rendering said first control means effective to produce relative movement between the spindle and workpiece and said digital control means effective to measure the relative forward movement of said carrier and workpiece toward each other after the tool in the spindle engages the workpiece and to stop the forward movement after a predetermined relative movement.

17. In a machine tool system as defined in claim 6 wherein said spindle is biased to a traverse position forwardly of said predetermined position and said drive means is actuated in response to said error signal to relatively move said spindle carrier and workpiece to effect engagement of said tool with said workpiece.

* * * * *